(12) United States Patent
Chiu et al.

(10) Patent No.: US 7,178,991 B2
(45) Date of Patent: Feb. 20, 2007

(54) OPTICAL TRANSCEIVER MODULE

(75) Inventors: Chia-Hung Chiu, Hsinchu (TW);
Cheng-Da Shaw, Hsinchu (TW);
Yi-Ming Chen, Hsinchu (TW);
Chiung-Hung Wang, Hsinchu (TW);
Yuan-Jen Chang, Hsinchu (TW);
Chi-Lun Hsu, Hsinchu (TW); Ming-Fa Huang, Hsinchu (TW); Chih-Hao Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 50 days.

(21) Appl. No.: 10/704,708

(22) Filed: Nov. 12, 2003

(65) Prior Publication Data

US 2005/0089281 A1   Apr. 28, 2005

(30) Foreign Application Priority Data

Jun. 20, 2003   (TW) ............................. 92116843 A (51) Int. Cl.
*G02B 6/36* (2006.01)

(52) U.S. Cl. ..................................... 385/88
(58) Field of Classification Search ............ 385/88–92
See application file for complete search history.

(56) References Cited

U.S. PATENT DOCUMENTS

| | | | | |
|---|---|---|---|---|
| 4,944,568 A * | 7/1990 | Danbach et al. | ............. | 385/88 |
| 5,117,476 A * | 5/1992 | Yingst et al. | ................. | 385/88 |
| 5,151,961 A * | 9/1992 | Hvezda et al. | ................ | 385/60 |
| 5,231,685 A * | 7/1993 | Hanzawa et al. | ............. | 385/84 |
| 5,487,124 A | 1/1996 | Bowen et al. | | |
| 6,061,481 A | 5/2000 | Heidrich et al. | | |
| 6,142,802 A | 11/2000 | Berg et al. | | |
| 6,198,558 B1 | 3/2001 | Graves et al. | | |
| 6,201,908 B1 | 3/2001 | Grann | | |
| 6,267,606 B1 | 7/2001 | Poplawski et al. | | |
| 6,305,848 B1 * | 10/2001 | Gregory | ...................... | 385/53 |
| 6,335,869 B1 * | 1/2002 | Branch et al. | ............. | 361/816 |
| 6,339,663 B1 | 1/2002 | Leng et al. | | |
| 6,350,063 B1 | 2/2002 | Gilliland et al. | | |
| 6,371,665 B1 | 4/2002 | Keska et al. | | |
| 6,421,150 B2 | 7/2002 | Graves et al. | | |
| 6,540,412 B2 * | 4/2003 | Yonemura et al. | ............ | 385/88 |
| 6,547,445 B2 * | 4/2003 | Kiani | .......................... | 385/53 |
| 6,558,046 B2 * | 5/2003 | Griffis et al. | ................. | 385/76 |
| 6,604,431 B1 | 8/2003 | Soga et al. | | |
| 6,652,161 B2 | 11/2003 | Grann et al. | | |
| 6,762,941 B2 * | 7/2004 | Roth | ......................... | 361/736 |
| 2002/0018625 A1 | 2/2002 | Grann et al. | | |
| 2002/0076173 A1 * | 6/2002 | Jiang et al. | ................... | 385/92 |

* cited by examiner

*Primary Examiner*—Ellen E. Kim
(74) *Attorney, Agent, or Firm*—Birch, Stewart, Kolasch & Birch, LLP (57) ABSTRACT

An optical transceiver module includes a plurality of optical signal transmission/receiving units to receive and transmit optical signals, and is fastened to a base by a fastening unit. Each optical signal transmission/receiving unit includes a heat sink to promote heat dissipation efficiency. An electromagnetic shielding part covers the optical receiver to isolate from electromagnetic interference. A guiding plate is provided in the module to comb terminals of the module when the low-density wavelength-multiplex transceiver module is to be placed in an electronic device.

12 Claims, 14 Drawing Sheets

| wavelength | Without electromagnetic shielding part (dBm) | | The receiver is grounded and coupled with the metallic upper (dBm) | |
|---|---|---|---|---|
| | First time detection | Second time detection | First time detection | Second time detection |
| 1510nm | -13.62 | -13.77 | -15.66 | -15.54 |
| 1530nm | -13.1 | -13.43 | 16.31 | -16.23 |
| 1550nm | -11.96 | -12.16 | -15.37 | -15.57 |
| 1570nm | -13.62 | -13.7 | -12.88 | -13.17 |

Fig.13

| wavelength | Iron made upper lid (grounded) (dBm) | | Plastic made upper lid (dBm) | |
| --- | --- | --- | --- | --- |
| | First time detection | Second time detection | First time detection | Second time detection |
| 1510nm | -16.31 | -16.18 | -16.85 | -16.76 |
| 1530nm | -18.99 | -18.88 | -19.96 | -20.54 |
| 1550nm | -16.45 | -16.26 | -16.99 | -17.02 |
| 1570nm | -15.96 | -16.21 | -16.43 | -16.5 |

Fig.14

| wavelength | the improvement of maximum channel sensitivity(dB) |
|---|---|
| 1510nm | 3.23 |
| 1530nm | 7.44 |
| 1550nm | 5.06 |
| 1570nm | 2.88 |

OPTICAL TRANSCEIVER MODULE

BACKGROUND OF THE INVENTION

1. Field of Invention

The present invention relates to an optical transceiver module, suitable for optical transmission through a small LAN.

2. Related Art

The application of optical fiber communication has been extended from long-distance telecommunication network and cable TV network to short-distance LAN and client loop. Optical communication devices and their production are crucial to optical fiber communication technology. In the future, it can be expected that optical fiber communication networks will be popularized to domestic appliances. At that time, active devices and module technology will play a preponderant role in such an advance.

Figure 1:
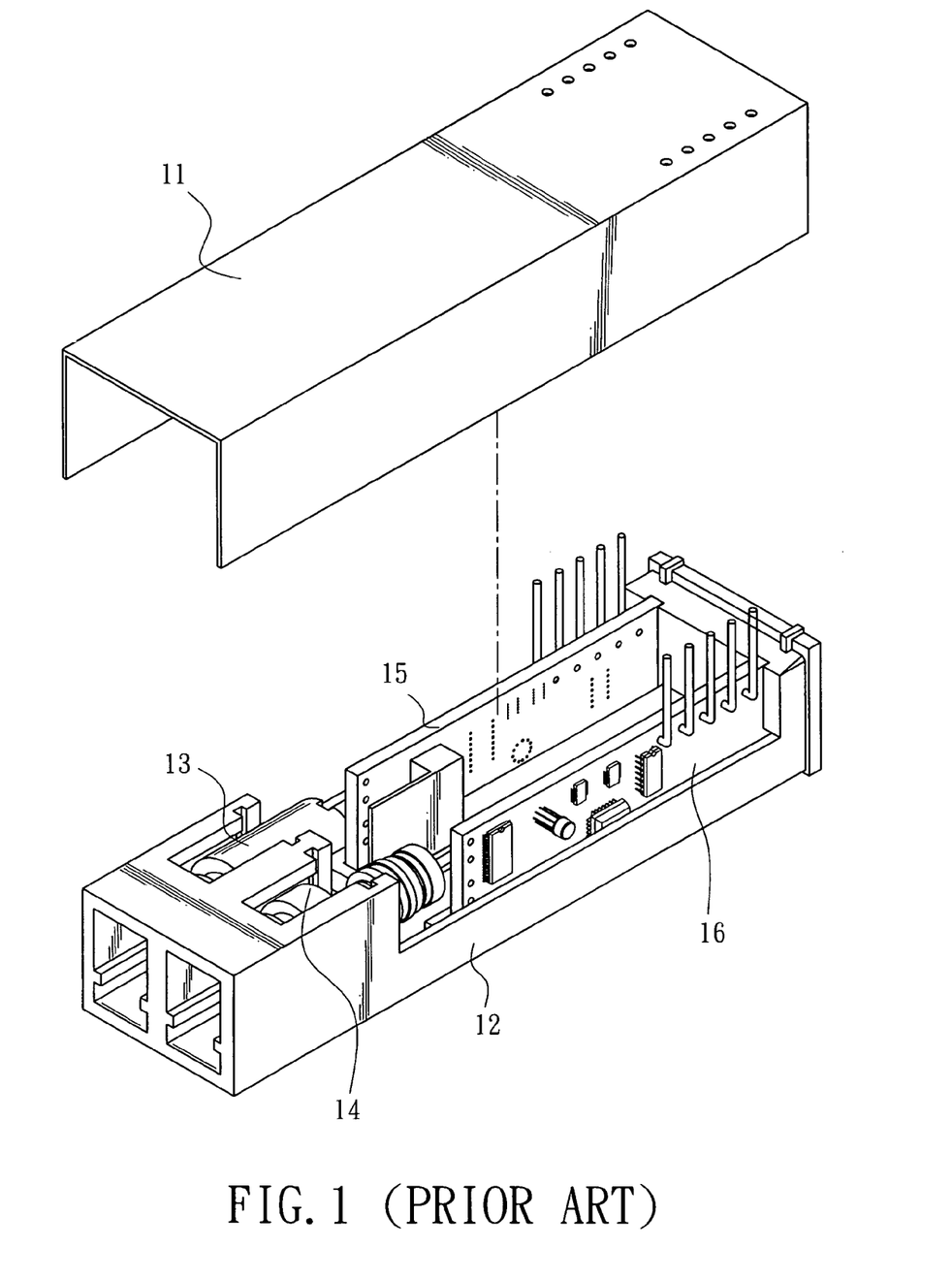
FIG. 1 is a perspective view of a conventional optical wavelength-multiplex transceiver module.

An optical transceiver module is mounted in an electronic device for optical transmission via the optical fibers of an optical transceiver module. FIG. 1 is a perspective view of an optical transceiver module. The optical transceiver module includes a casing 11, a base 12, an optical receiver 13, an optical transmitter 14, a receiver circuit 15 and a transmitter circuit 16.

The base 12 carries the receiver circuit 15 and a transmitter circuit 16. The casing 11 covers the base 12 to protect the components therein. The receiver circuit 15 and the transmitter circuit 16 are respectively provided with a receiver chip and a transmitter chip respectively for optical signal processing and transmission driving. Optical transmission/reception of the electronic device is performed via pins 151, 161 respectively formed on the receiver circuit 15 and the transmission circuit 16 in the base 12.

However, since the optical receiver and the optical transmitter are integrated in a casing of the optical transceiver module, some problems may occur concerning heat dissipation, the arrangement of the optical fibers, and the alignment of the pins of the circuit board with through holes of substrates of other electronic devices, electromagnetic interference and electromagnetic radiation. These issues are discussed in detail as follows.

1. Heat dissipation:

The whole optical transceiver module includes a plurality of optical receivers and optical transmitters. Heat mainly comes from the receiver chip and the transmitter chip of the receiver and the transmitter. Heat only can be spread out through convection inside the closed space of the optical transceiver module. Therefore, heat dissipation efficiency is not satisfactory.

2. Arrangement of optical fibers:

Although a commercially available optical fiber connector can be adapted to connect the optical fiber, the optical receiver 13 and the optical transmitter 14, additional fitting still may be needed to match these elements with one another, which is inconvenient in use.

3. Alignment of the pins of the circuit board with through holes of substrates of other electronic devices:

The pins 151 of the receiver circuit 15 and the pins 161 of the transmitter circuit 16 connect to the substrate of the electronic device as interconnection. It is difficult to precisely insert so many pins in corresponding insertion holes of the substrate at one time, especially when one lead is bent or deformed.

4. Electromagnetic radiation and electromagnetic interference:

With the demand of smaller size and lightweight devices, a pitch between the receiver and the corresponding optical transmitter in the optical transceiver module has to be small. Electrical current of the optical transmitter generates electromagnetic radiation that jams the reception of high-frequency signal at the receiver. If the light intensity is small, the signal at the optical transmitter jams the signal at the receiver, which seriously affects the precision of signal reception.

SUMMARY OF THE INVENTION

It is therefore an object of the invention to provide an optical transceiver module suitable for optical signal transmission. The optical transceiver module is coupled with one or more optical fiber to receive and/or transmit an optical signal from/to an electronic device.

The optical transceiver module of the invention includes four optical signal transmission/receiving units, each unit having an optical transmitter. Each unit includes a pair of circuit boards with a plurality of pins. Each circuit board has a transmitter chip and a receiver chip that respectively connect to an optical transmitter and an optical receiver. With optical fibers, the optical signal is transmitted to a wavelength multiplexer/demultiplexer for signal integration/division.

Each optical fiber connected to the optical transmitter and the optical receiver is arranged in order, with an exit of the optical fibers facing an I/O connector. Therefore, no optical fiber is wound during assembly of the optical transceiver module.

A casing of the multiplexer/demultiplexer is used as base of the optical transceiver module to accommodate the optical signal transmission/receiving units, the optical fibers and an upper lid, thereby enabling easy assembly of the module with a reduced number of components.

A heat sink is sandwiched in the module to conduct heat outside from the optical transmitter and the optical receiver without adverse influence, temperature effects on the inside optical devices of the module are thereby reduced.

The optical transmitter and the optical receiver are fastened to the optical fibers by means of a fastening unit, instead of a connecting sleeve usually used in the art. The fastening unit includes a pair of retainers, a pair of standoffs, a fastening piece and a spring coil. Compared to the prior art, the size of the module after assembly is significantly reduced.

In order to more effectively insert the pins of the circuit board of the module into corresponding insertion holes of a substrate of an electronic device, a guiding plate is provided. The guiding plate has a plurality of guiding holes corresponding to the insertion holes of the substrate, so that the pins are guided through the guiding holes in the insertion holes.

As described above, the optical transceiver module of the invention is fabricated with high component integration, high reliability and low cost, and is suitable for present optical signal transmission/reception through optical fibers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will become more fully understood from the detailed description given herein below illustration only, and thus are not limitative of the present invention, and wherein:

FIG. 11 is a graph showing the conversion of the optical signal received by the receiver into an electrical signal when the optical transmitter is located near the receiver without electromagnetic shield there between;

FIG. 12 is a graph showing the conversion of the optical signal received by the receiver into an electrical signal when the optical transmitter is located near the receiver with an electromagnetic shield there between;

DETAILED DESCRIPTION OF THE INVENTION

Figure 2:
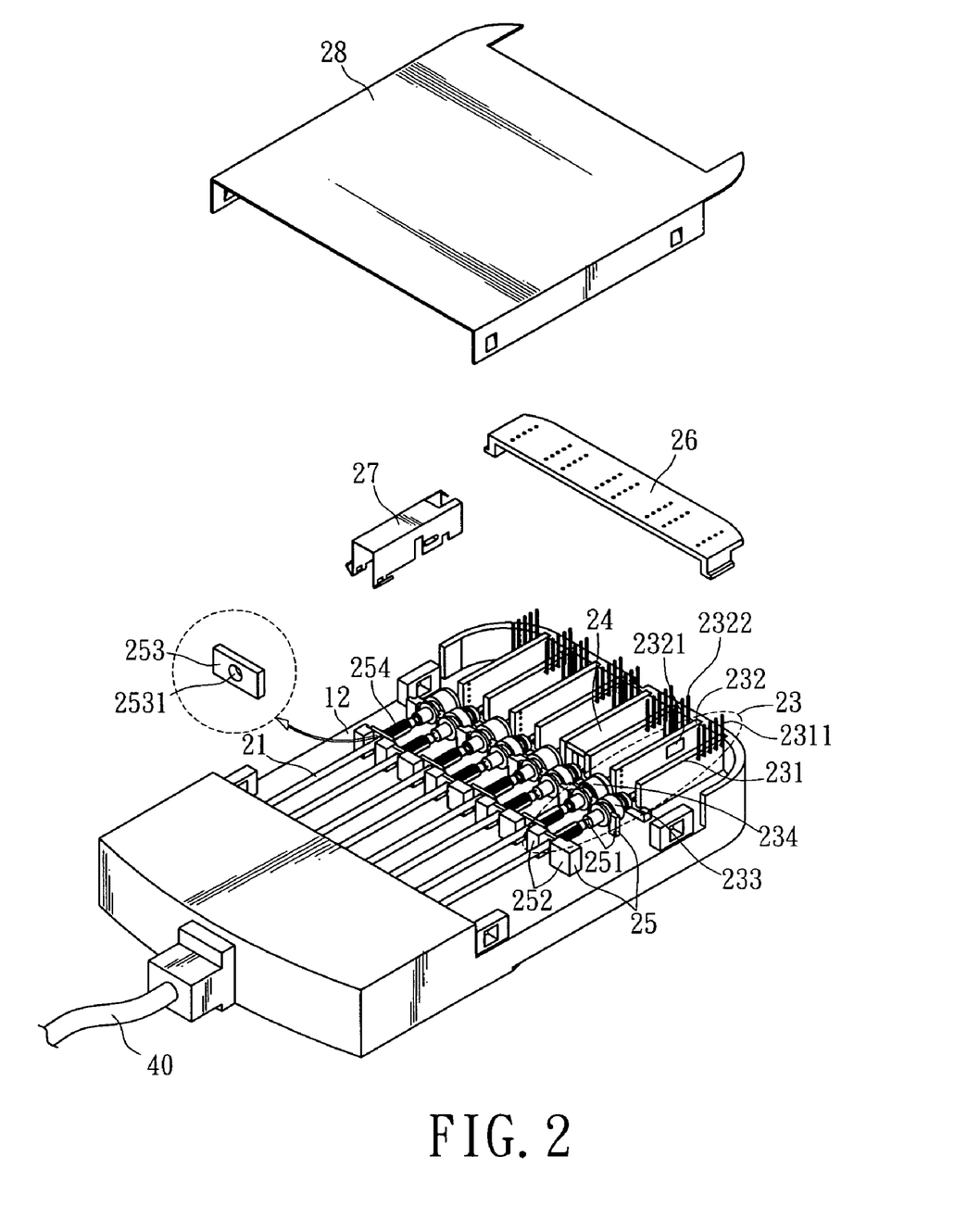
FIG. 2 is a perspective view of an optical transceiver module according to one embodiment of the invention.
Figure 3:
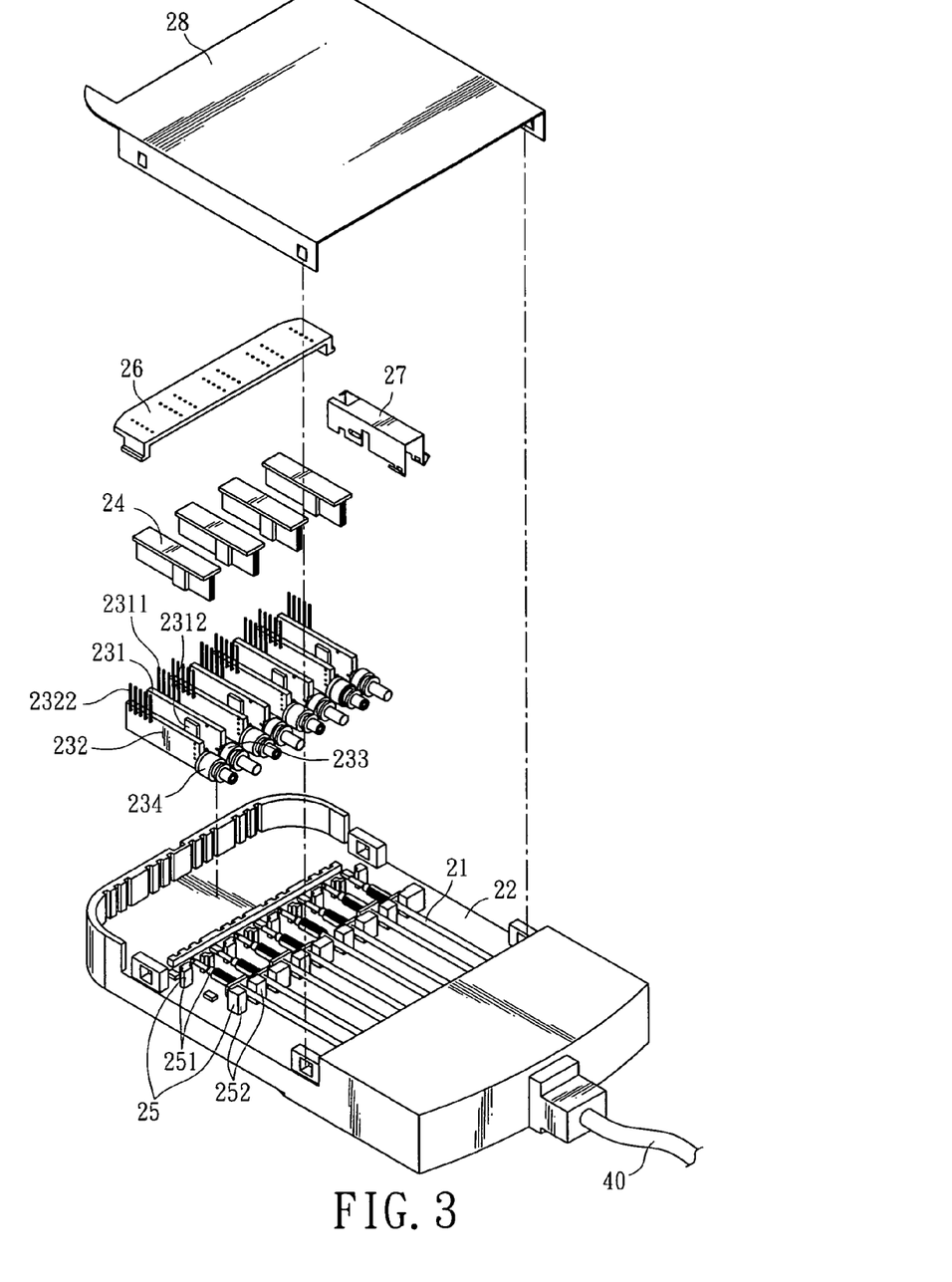
FIG. 3 is an exploded view of an optical transceiver module according to one embodiment of the invention.

FIG. 2 is a perspective view of an optical transceiver module (shown without the assembly of a guiding plate 26 and an upper lid 28) according to one embodiment of the invention. FIG. 3 is an exploded view of an optical transceiver module according to one embodiment of the invention. The optical transceiver module is suitable for signal transmission in a metropolitan area network (MAN), and its features determine data transmission speed. As shown, the optical transceiver module receives and transmits optical signals from and to a communication device (not shown) via coupled optical fibers 21. Aside optical fiber media, signal transmission can be achieved via other media such as, free space or PLC. However, the embodiments of the invention will be exemplary illustrated with the utilization of optical fibers as communication means.

The optical transceiver module includes a base 22, an optical signal transmission/receiving unit 23, a heat sink 24, a fastening unit 25, a guiding plate 26, an electromagnetic shielding part 27 and an upper lid 28.

The base 22 carries, for example, an optical signal transmission/receiving unit 23 and a heat sink 24. An optical multiplexer/demultiplexer (Mux/DeMux) (not shown) is mounted in the base 22 to connect to each optical fiber 21. The optical Mux/DeMux is responsible for integration/division of the optical signals transmitted from or received by the optical fibers 21: in signal integration, four optical signals of different wavelengths, for example, are collectively transmitted via one optical fiber 21; in signal division, four optical signals of different wavelengths originally transmitted via one optical fiber 21 are respectively transmitted via separate optical fibers 21. The optical Mux/DeMux connects to an external main optical fiber 40 for optical signal transmission between the module and other devices. The upper lid 28 covers the base 22 to protect the components therein.

The optical signal transmission/receiving unit 23 is mounted on the base 22. The unit 23 is operable to transmit and receive optical signals, and includes a pair of Tx circuit board 231 and Rx circuit board 232 respectively responsible for optical signal transmission and reception. The Tx circuit board 231 and the Rx circuit board 232 are parallel to each other and perpendicular to the base 22.

The Tx circuit board 231 and Rx circuit board 232 respectively have a transmitter chip (not shown) and a receiver chip 2321 placed opposite to the transmitter chip. The transmitter chip and the receiver chip respectively connect to an optical transmitter 233 and an optical receiver 234 of the corresponding optical fiber 21 to achieve telecommunication to an external electronic device through Tx pin 2311 of the Tx circuit board 231 and Rx pin 2322 of the Rx circuit board 232. The optical signal is transmitted to or from the electronic device via the optical fibers 21.

LED or laser diode can be used as a light source of the optical transmitter 233. PIN or PIN-TIA is used as a main component of the optical receiver 234 for optical signal receiving.

Figure 4:
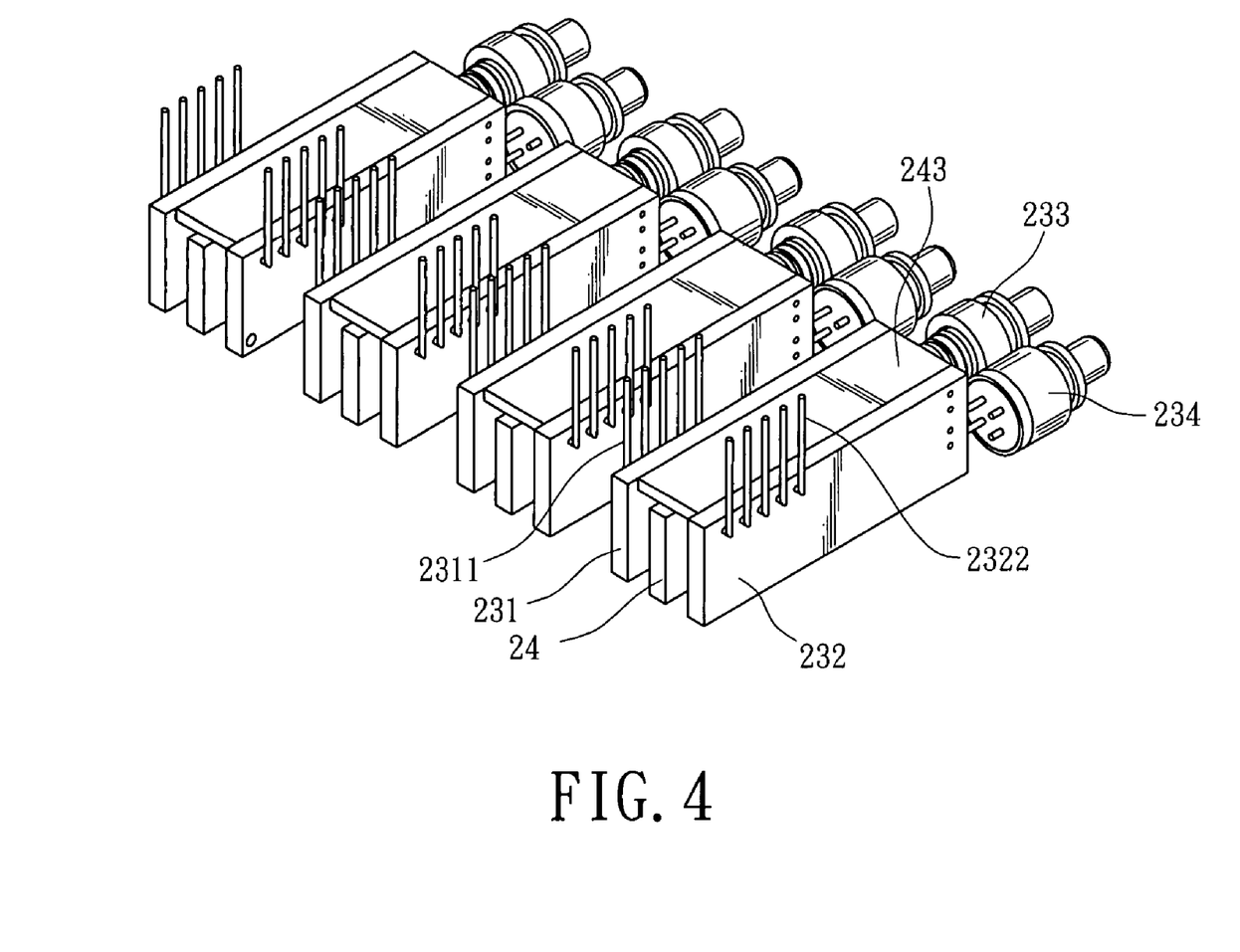
FIG. 4 is a perspective view illustrating a heat sink sandwiched between circuit boards according to one embodiment of the invention.
Figure 5:
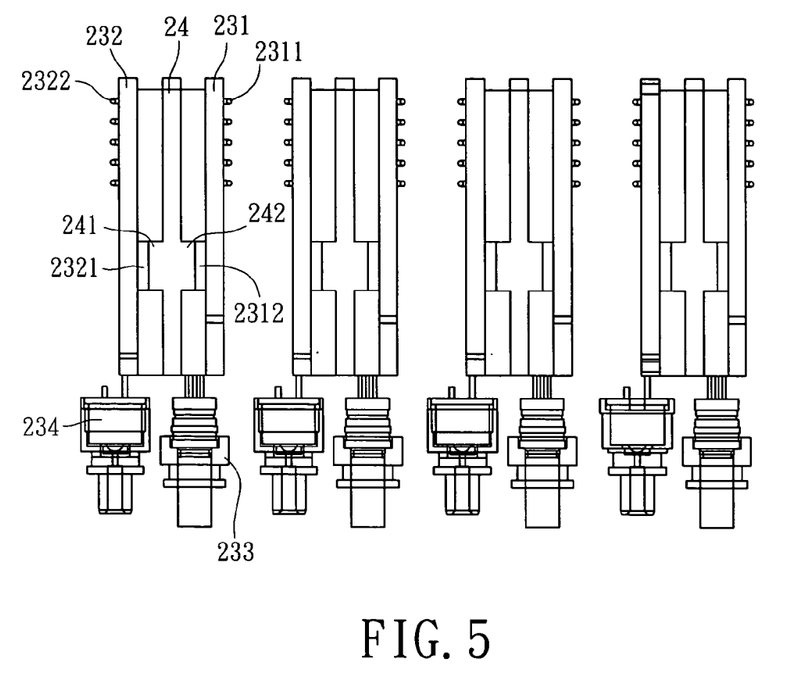
FIG. 5 is a top view of a heat sink sandwiched between circuit boards according to one embodiment of the invention.

FIG. 4 is a perspective view illustrating a Tx circuit board 231, an Rx circuit board 232, and a heat sink 24 sandwiched between the Tx circuit board 231 and the Rx circuit board 232 according to one embodiment of the invention. FIG. 5 is a top view illustrating a Tx circuit board 231, an Rx circuit board 232, and a heat sink 24 sandwiched between the Tx circuit board 231 and the Rx circuit board 232 according to one embodiment of the invention. The heat sink 24 promotes heat dissipation from the inside of the optical transceiver module.

Protrusions 241, 242 are respectively formed on two sides of the heat sink 24. The protrusion 241 contacts with adjacent plurality of heat generating components, including the transmitter chip 231 of the Tx circuit board 231 and the receiver chip 232 of the Rx circuit board 232, because most of the heat is generated by the Tx circuit board 231 and the Rx circuit board 232. Heat is transferred out via the protrusions 241, 242. The heat sink 24 is made of a highly thermal conductive material such as copper and aluminum to increase heat efficiency.

A bottom of the heat sink 24 is attached on the base 22, so that heat is further conducted to the base 22. A top portion 243 of the heat sink 24 attaches to the upper lid 28. The upper lid 28 covers the whole base 22 and, with the heat sink 24, contributes to heat dissipation.

Figure 6:
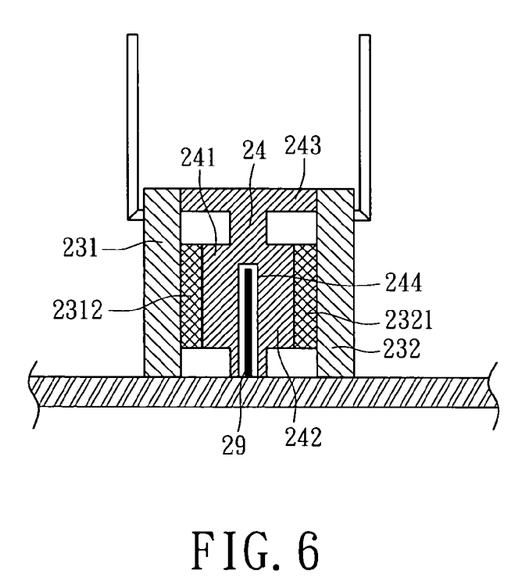
FIG. 6 is a cross-sectional view of a heat sink.

FIG. 6 is a cross-sectional view of a heat sink 24 used in the module according to one embodiment of the invention. In order to prevent cross talk between the Tx circuit board 231 and the Rx circuit board 232, which may adversely affect signal quality, a groove 244 with a metal shielding material 29 such as a metal mesh can be further formed inside the heat sink 24 to reduce signal interference between the Tx circuit board 231 and the Rx circuit board 232.

As shown in FIG. 2, each optical signal transmission/receiving unit 23 has one fastening unit 25 mounted on the base 22 to fasten each optical fiber 21 to each pair formed of one optical transmitter 233 and one optical receiver 234. The fastening unit 25 includes a pair of retainers 251, a pair of standoffs 252, a fastening piece 253 and a spring coil 254.

The retainers 251 respectively hold the optical transmitter 233 and the optical receiver 234 from the two sides to retain them at their predetermined positions. The standoffs 252 are spaced away from the corresponding retainers 251. A fastening piece 253 with a central hole 2531 abuts against the standoffs 252 in a manner that one optical fiber 21 is secured between the pair of retainers 251 and between the pair of standoffs 252 while penetrating through the central hole 2531 of the fastening piece 253.

The optical fiber 21 is sleeved within a spring coil 254 and a fastening piece 253. A short side of the fastening piece 253 is turned upward to allow the spring coil 254 and the fastening piece 253 passing between the pair of standoffs 252. Then, a long side of the fastening piece 253 is turned upward to abut against the pair of standoffs 252.

When a ferrule of the optical fiber 21 is inserted in receptacles of the optical transmitter 233 and the optical receiver 234, the fastening piece 253 compresses the spring coil 254. Once the spring coil 254 is subjected to compression, the fastening piece 253 is pressed by a counterforce from the spring coil 254, thereby fastening the optical fiber to the optical transmitter 233 and the optical receiver 234.

Figure 7:
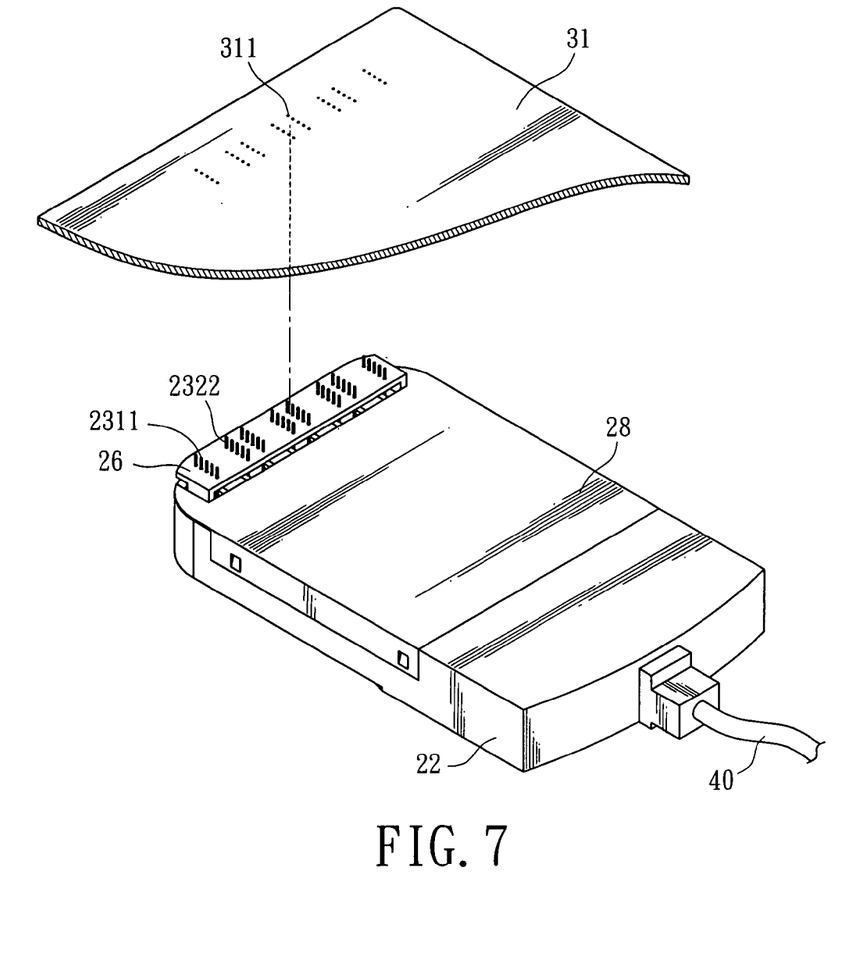
FIG. 7 is a perspective view illustrating the connection between a substrate of an electronic device and a circuit board of an optical transceiver module according to one embodiment of the invention.

Referring to FIG. 7, the Tx pin 2311 and the Rx pin 2322 of the Tx circuit board 231 and the Rx circuit board 232 are bonded to corresponding insertion holes 311 of a substrate 31 in the electronic device for electrical connection between the optical transceiver module and the electronic device. If any one of the Tx pin 2311 and the Rx pin 2322 are bent or deformed when they are to be inserted in the substrate 31, it becomes difficult to insert the whole module in the substrate 31.

A guiding plate 26 with guiding hole 261 is provided to correspond with the insertion holes 311 of the substrate 31. When the Tx pin 2311 and the Rx pin 2322 are inserted in the insertion holes 311 of the substrate 31, the guiding plate 26 is pulled up to comb each Tx pin 2311 and each Rx pin 2322 in order to help smooth insertion of the Tx pin 2311 and the Rx pin 2322 into the corresponding insertion holes 311 of the substrate 31.

Figure 8:
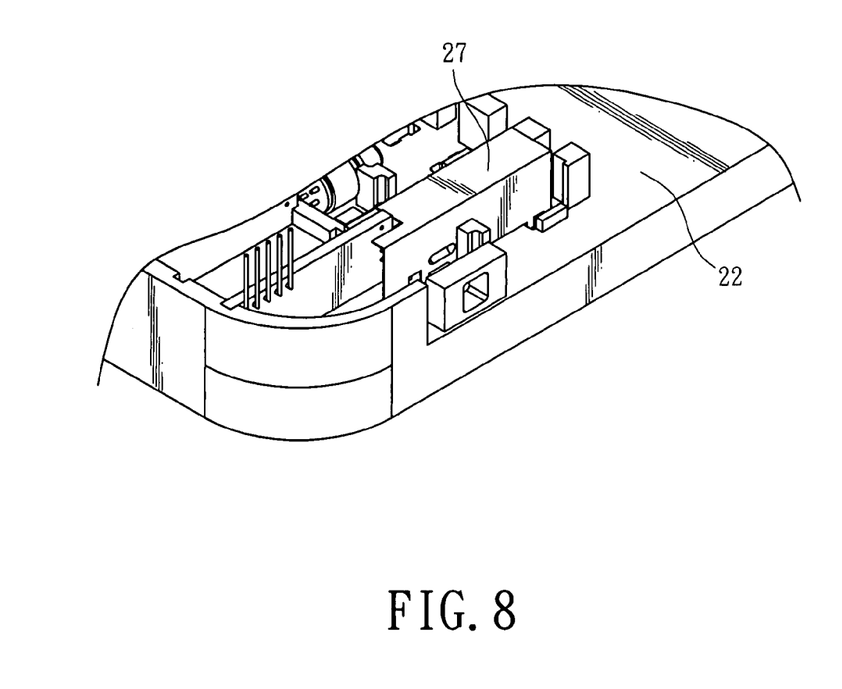
FIG. 8 is a schematic view illustrating a base assembled with an electromagnetic shielding part according to one embodiment of the invention.
Figure 9:
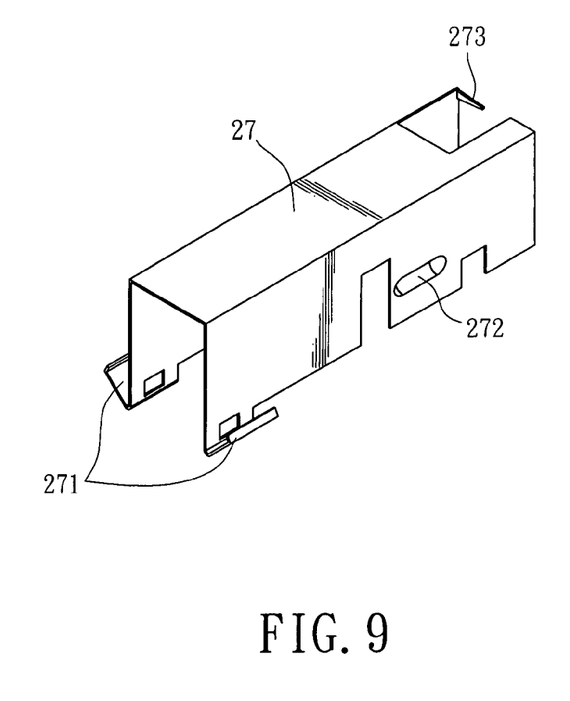
FIG. 9 is a perspective view of an electromagnetic shielding part.

In the optical transceiver module of the invention, the optical transmitter and the optical receiver are located close to each other. The optical transmitter requires a higher amount of electrical current and transmits a high-frequency signal. Therefore, electromagnetic radiation is easily generated to adversely affect signal reception. To avoid this problem, an electromagnetic shielding part 27 is further mounted around the joint of the optical fiber 21 with each optical receiver 234.

The electromagnetic shielding part 27 further has a pair of elastic sheets 271 near the base 22. The base 22 has a slot (not shown) corresponding to the elastic sheets 271. When the electromagnetic shielding part 27 is to be fastened, the elastic sheets 271 are snapped with the slot of the base 22 to fasten the electromagnetic shielding part 27 on the base 22.

The electromagnetic shielding part 27 further has grooves 272 on two sides to connect to the optical receiver 234. A protrusion 273 is formed on the electromagnetic shielding part 27 near the circuit board 232 to connect to the circuit board 232. The arrangement of these components makes these components being grounded to equalize their voltages.

The following test illustrates the reduction of the electromagnetic interference at the receiver by using the electromagnetic shielding part 27.

Figure 10:
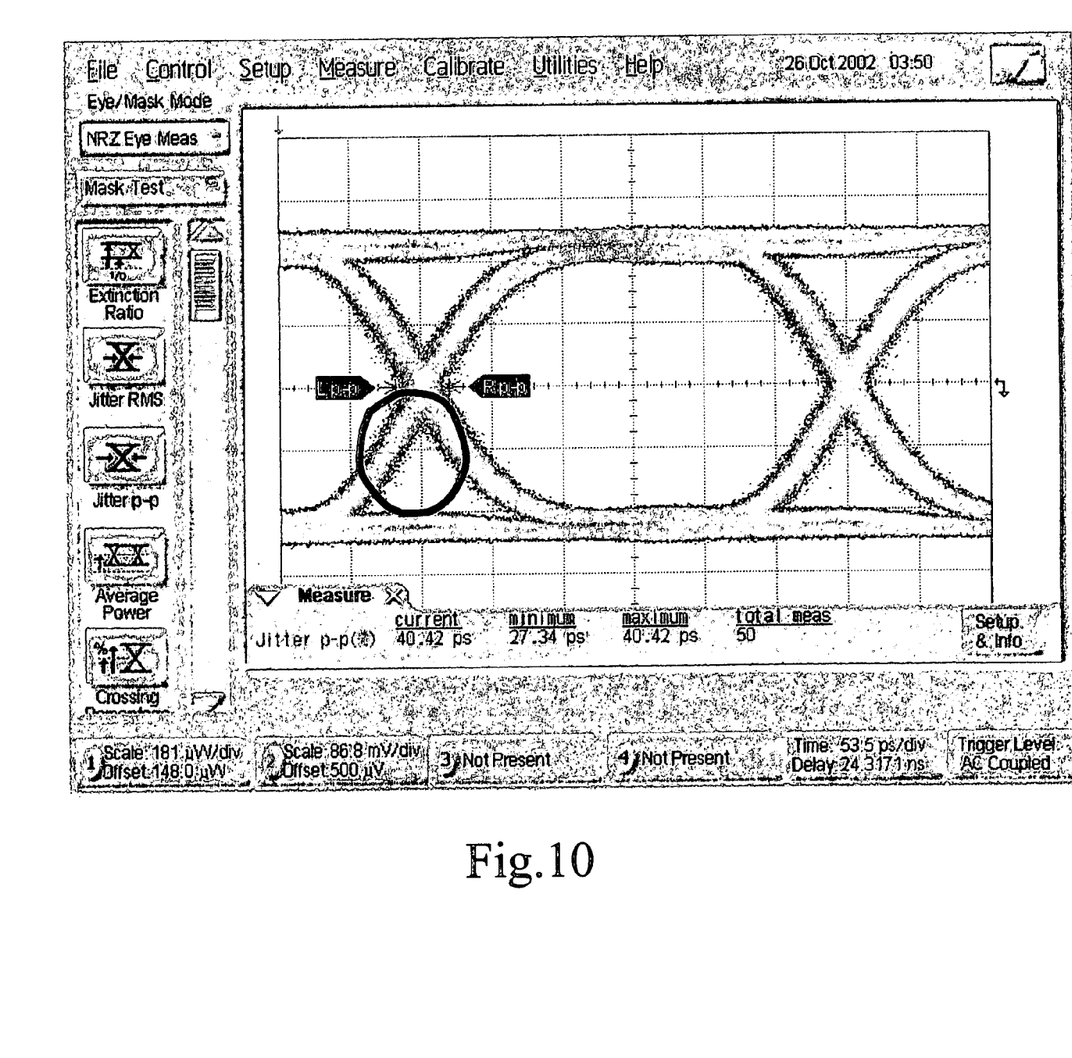
FIG. 10 is a graph showing the conversion of the optical signal received by the receiver into an electrical signal when the optical receiver and the optical transmitter are far away each other.
Figure 11:
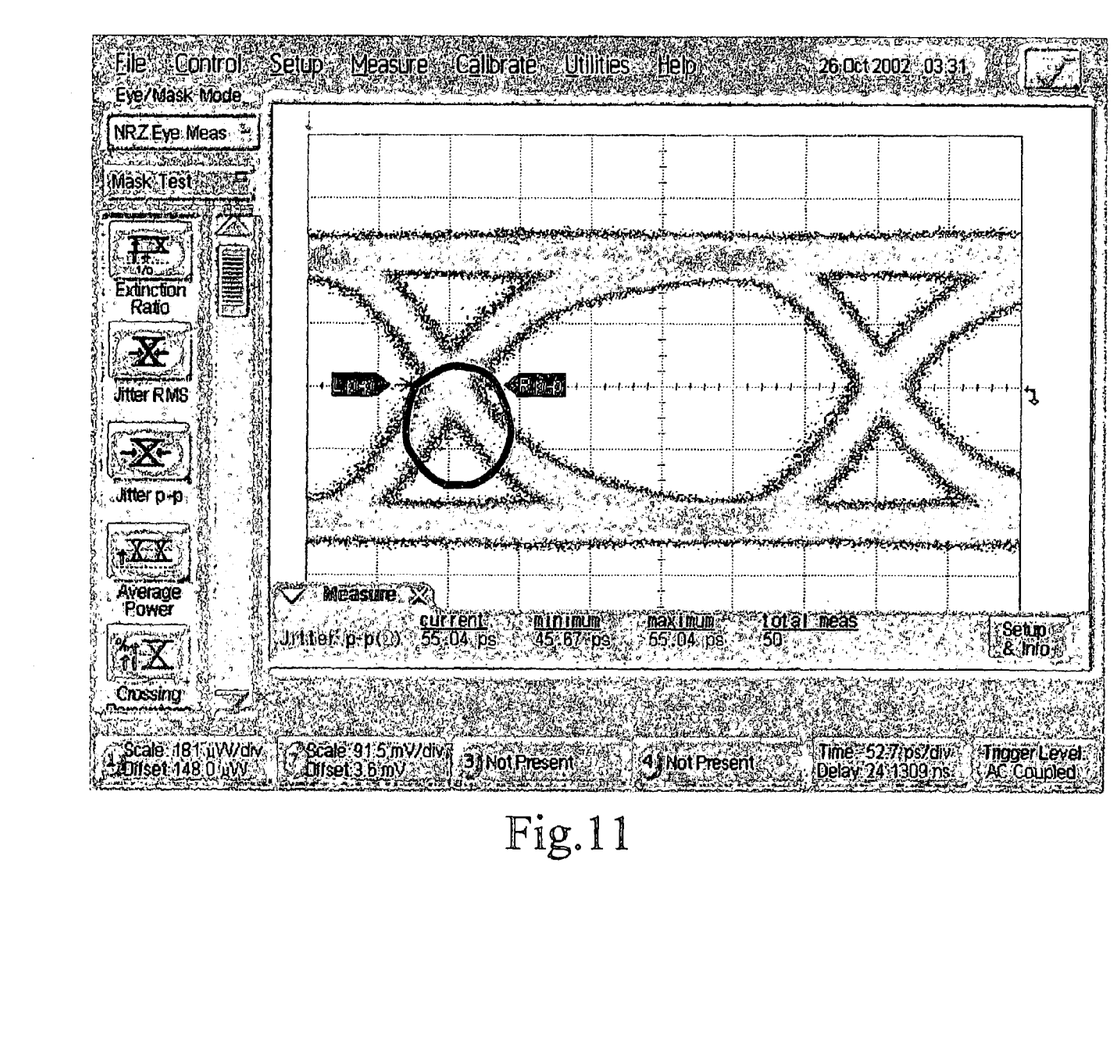
Figure 12:
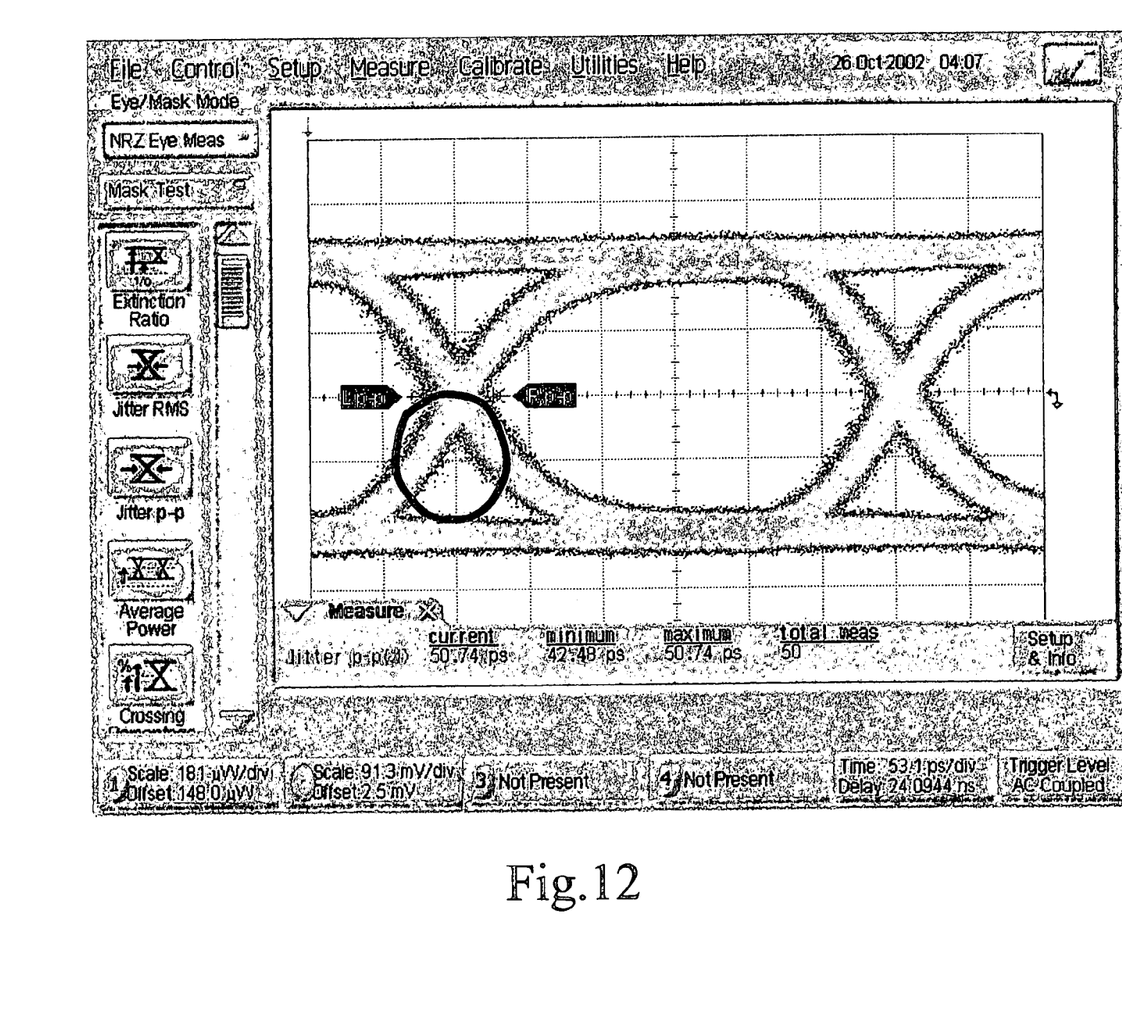

FIG. 10 is a graph showing the conversion of the optical signal received by the receiver into an electrical signal when the optical receiver and the optical transmitter are far away from each other. FIG. 11 is a graph showing the conversion of the optical signal received by the receiver into an electrical signal when the optical transmitter is located near the receiver, without the mounting of an electromagnetic shielding part 27 there between. FIG. 12 is a graph showing the conversion of the optical signal received by the receiver into an electrical signal when the optical transmitter is located near the optical receiver with an electromagnetic shielding part 27 mounted there between.

From FIG. 10 to FIG. 12, when the optical receiver and the optical transmitter are close to each other without the presence of an electromagnetic shielding part 27, the signal at the optical receiver fluctuates significantly due to the influence of a high-frequency signal transmitted from the optical transmitter. As shown by the encircled area, the larger the thickness of the line at the intersection, the more severe the signal fluctuates. However, when the electromagnetic shielding part 27 is mounted (as shown in FIG. 12), electromagnetic interference affecting the signal received by the receiver is reduced, compared with the results of FIG. 11.

Figure 13:
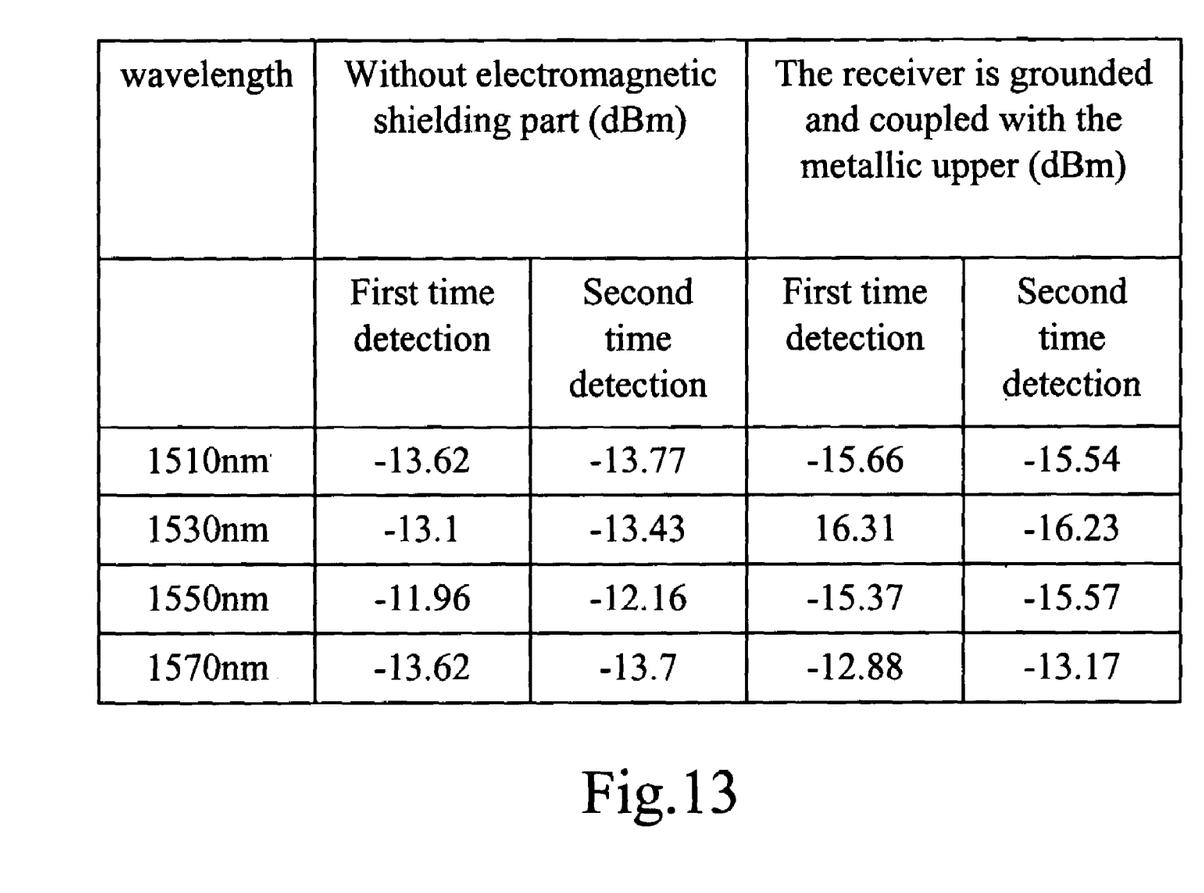
FIG. 13 illustrates the sensitivity of the receiver after the receiver is grounded and then coupled with the metallic upper lid, while the optical transceiver module is not provided with any electromagnetic shield.

In order to avoid increase in fluctuation of the received signal caused by electromagnetic radiation from the optical transmitter, the metallic upper lid 28 is coupled with the receiver 234 after the receiver 234 is grounded to increase the grounding area for absorbing the radiation from the optical transmitter. FIG. 13 illustrates the sensitivity of the receiver 234 after the receiver 234 is grounded and then coupled with the metallic upper lid 28 in case the optical transceiver module is not provided with any electromagnetic shield.

A feedback mode optical fiber transceiver module obtains the data in FIG. 13. That is, the signals are separately transmitted from the optical transmitter of the respective circuit board, and then integrally transmitted to the receiver through one optical fiber 21 after having been processed via a wavelength Mux (multiplex). A wavelength DeMux (demultuplex) operates to separately transmit signals of different wavelengths to their corresponding receiver circuits. By sequentially grounding the receiver 234 and the upper lid 28, the sensitivity of the receiver 234 at wavelength 1510 nm, 1530 nm and 1550 nm is significantly improved. The smaller the data are measured, the higher the sensitivity is. The sensitivity at 1570 nm of wavelength is slightly lowered.

In order to have better electromagnetic shielding and improve the lower sensitivity at 1570 nm of wavelength for the receiver, a copper alloy with high conductivity as the electromagnetic shielding part 27 surrounds each receiver 234. The electromagnetic shielding part 27 is further bonded to the circuit board 232 by soldering and electrically connected to a reference voltage (ground) from its solder joint. The grounding area of the receiver extends to the whole receiver 234 and to the interface between the circuit board and ICs. The area for grounding external electromagnetic radiation is thus widened, and the voltage between the receiver 234 and electromagnetic shielding part 27 is kept stable to obtain improved shielding effect. Thereby, the signal is transmitted through the receiver 234 to IC with less noise interference.

Figure 14:
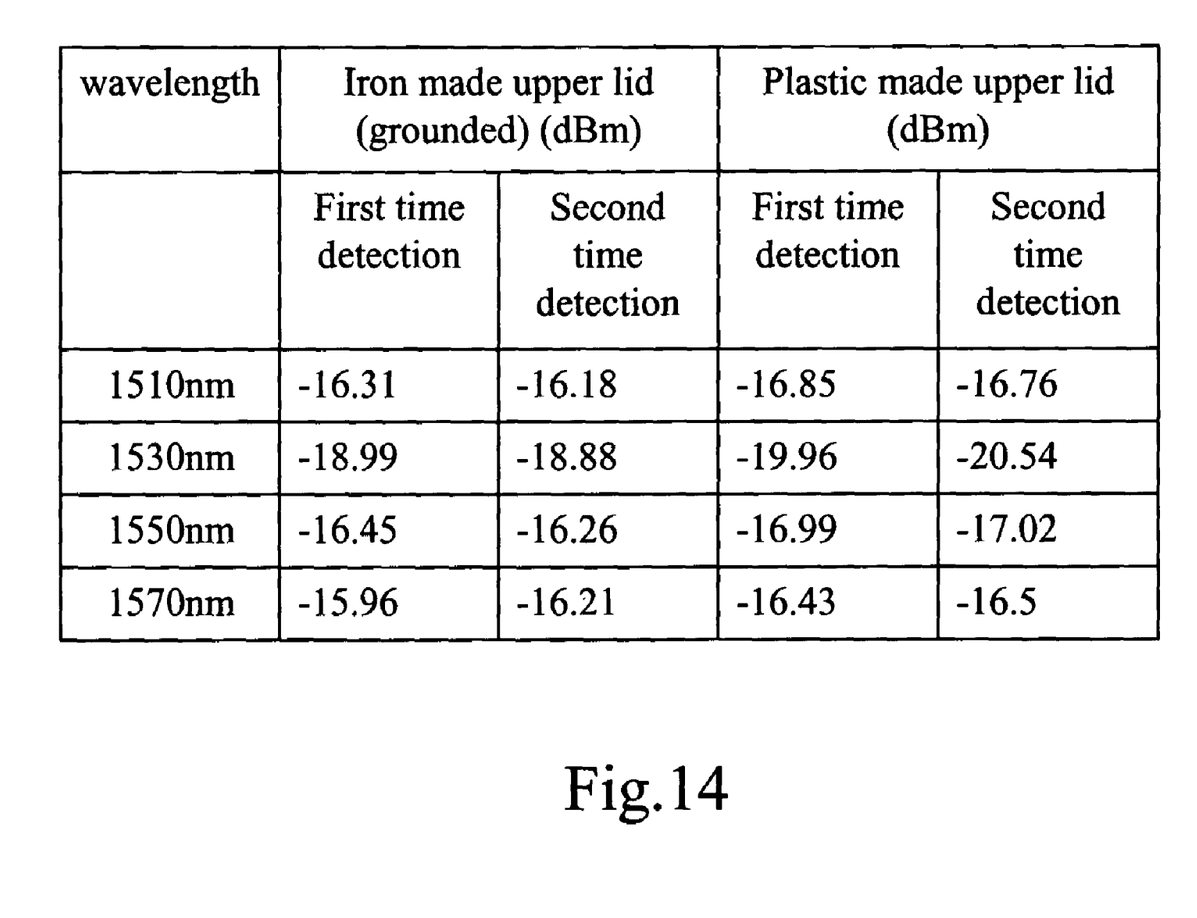
FIG. 14 shows the sensitivity of the receiver in an optical transceiver module provided with an electromagnetic shield and upper lids of different materials.
Figure 15:
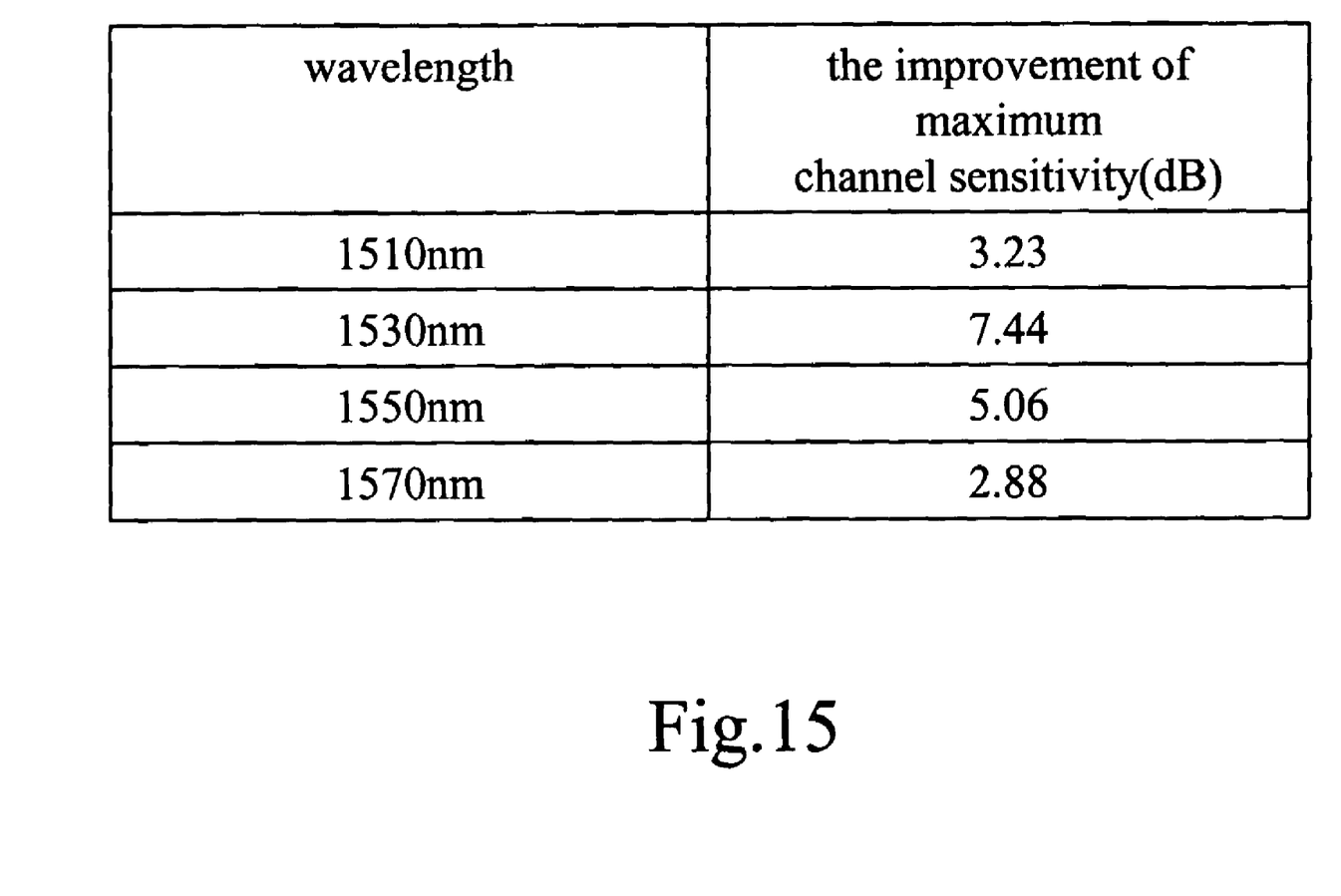
FIG. 15 shows the improvement of maximum channel sensitivity at different wavelengths in an optical transceiver module provided with an electromagnetic shield.

As for the upper lid 28 of the optical transceiver module according to the invention, since the electromagnetic shield provides good isolation for the receiver 234, the lid 28 is not necessarily made of metal which may be heavy and expensive. Instead, lightweight and inexpensive plastics can be used to replace the metal to make the lid 28. Furthermore, the plastics lid prevents electromagnetic shielding effect provided by the electromagnetic shielding part 27 from being deteriorated. FIG. 14 shows the sensitivity data of the receiver in an optical transceiver module that includes the electromagnetic shielding part 27 and upper lids 28 of different materials. FIG. 15 shows the improvement of maximum channel sensitivity at different wavelengths in an optical transceiver module that includes the electromagnetic shielding part 27. As shown in FIG. 15, the sensitivity of the receiver is greatly improved after the electromagnetic shielding part 27 is mounted, regardless of the type of material used for the lid 28.

Figure 16:
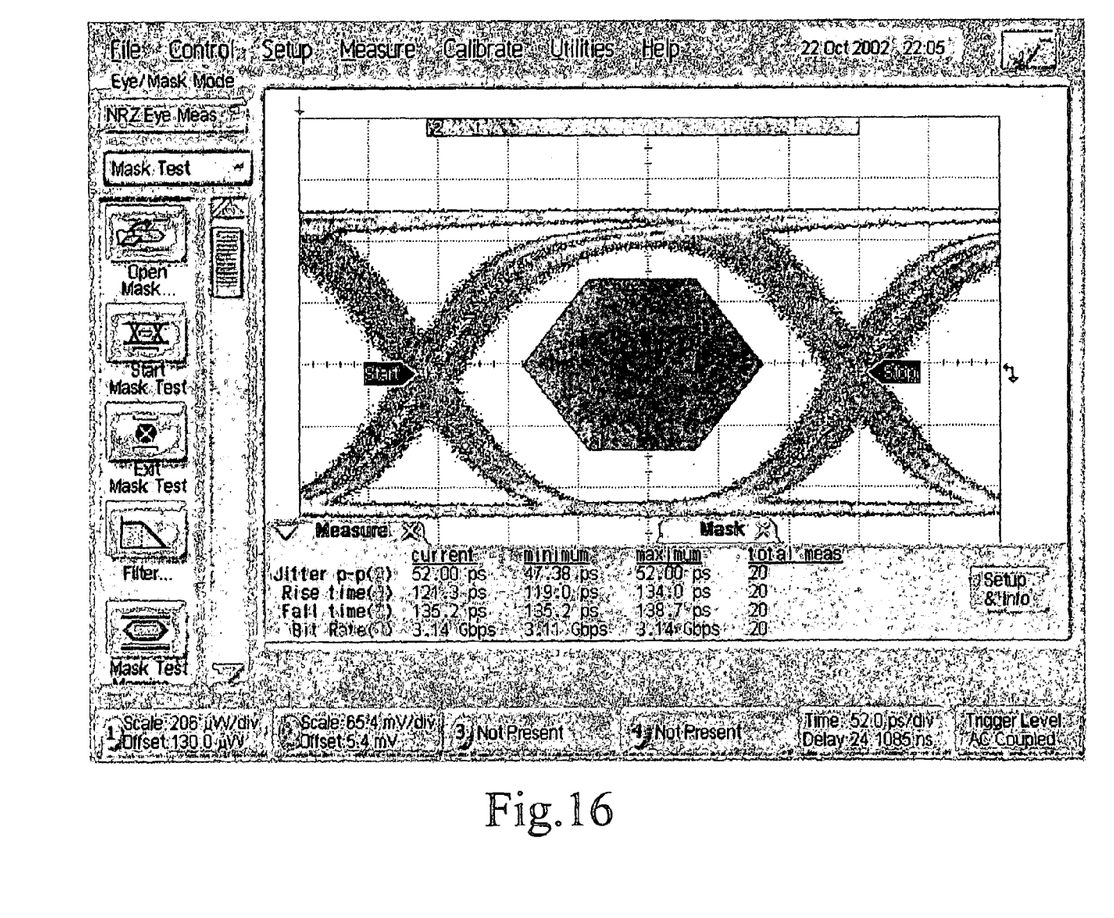
FIG. 16 is a graph illustrating the results obtained from single mode (SM) optical fiber transmission feedback test performed on a distance of 35-mile using the optical transceiver module of the invention.

FIG. 16 is a graph showing the results obtained from a single mode (SM) optical fiber transmission feedback test performed on a distance of 35 km using the optical transceiver module. A wave generator generates electrical signals of 3.125 Gbps PRBS $2^{23}-1$ that are then transmitted to channels of the optical transmitter at different wavelengths. Then, the electrical signals are converted into optical signals and processed by the Mux for 35 km single mode transmission via the optical fibers. Thereafter, the signals of different wavelengths are distributed to their corresponding channels via the DeMux.

The light at 1.5 µm of wavelength has dispersion via the optical fibers. Therefore, after the optical signal has been converted back to the electrical signal for each channel and correct timing data and clock has been retrieved by CDR (clock and data recovery), it is necessary to discriminate the correct data from the wrong ones by means of an error detector.

As illustrated in FIG. 16, the optical transceiver module of the invention precisely transmits the data without a bit error, even in long-distance transmission, for example 35 km, via the optical fiber. Therefore, it is reliable to apply the optical transceiver module of the invention in optical signal transmission via LAN.

The invention is not only applied to the optical transceiver having both optical transmission and reception functions, but also to a transmission-only optical transmitter or a receiving only optical receiver, depending on the purpose of applications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical transceiver module that communicates with an external communication device by receiving and/or transmitting an optical signal, the module comprising:
   a base;
   an optical wavelength multiplexer/demultiplexer, mounted inside the base for integration or division of the optical signal;
   a plurality of optical transmitters and optical receivers, connecting to the multiplexer /demultiplexer to transmit and receive the optical signal;
   a plurality of circuit boards, connected to the plurality of optical transmitters and optical receivers and each of the plurality of circuit boards having a plurality of pins for electrically communicating with the external communication device; and
   a guiding plate mounted on the base, said guiding plate having a plurality of guiding holes with said guiding holes corresponding to and aligned with said plurality of pins, said guiding holes receiving said pins so as to properly align said pins for connection with said external communication device, whereby said pins extend through the guiding plate, but are free from the guiding plate.

2. The optical transceiver module of claim 1, further comprising an upper lid covering the base to reduce electromagnetic interference of the optical transceiver module.

3. The optical transceiver module of claim 1, wherein the circuit boards are parallel to each other and perpendicular to the base.

4. The optical transceiver module of claim 1, further comprising at least one heat sink mounted on the base, the plurality of circuit boards including a plurality of heat generating components, the heat sink being in contact with the base and the plurality of heat generating components adjacent to the heat sink to conduct the heat from the plurality of heat generating components.

5. The optical transceiver module of claim 4, wherein the heat sink further comprising a top far away from the base to increase heat conducting efficiency.

6. The optical transceiver module of claim 4, wherein the heat sink further comprising a groove for containing a shielding material.

7. The optical transceiver module of claim 4, further comprising a groove formed inside the heat sink and a metal mesh disposed inside the groove to prevent cross talk between the circuit boards.

8. The optical transceiver module of claim 1, further comprising at least one electromagnetic shielding parts covering the optical receiver and connecting to the base to prevent electromagnetic interference.

9. The optical transceiver module of claim 8, wherein the electromagnetic shielding parts further comprising at least one groove on two sides to connect to the optical receiver.

10. The optical transceiver module of claim 8, wherein the electromagnetic shielding parts further comprising at least one protrusion to connect to the circuit board of the optical receiver.

11. The optical transceiver module of claim 1, wherein the guiding plate is moved to comb said pins in order to align the pins for insertion into holes of a substrate which provide communication with the external communication device.

12. The optical transceiver module of claim 1, wherein the guiding plate extends across a section of said base containing said pins and is connected to said base at opposite ends of said guiding plate.

* * * * *